US012785111B2

(12) United States Patent
Kanda et al.

(10) Patent No.: US 12,785,111 B2
(45) Date of Patent: Nov. 3, 2026

(54) POROUS BODY AND FUEL CELL INCLUDING THE SAME

(71) Applicant: SUMITOMO ELECTRIC INDUSTRIES, LTD., Osaka (JP)

(72) Inventors: Ryoko Kanda, Osaka (JP); Masatoshi Majima, Osaka (JP); Mitsuyasu Ogawa, Osaka (JP); Kazuki Okuno, Osaka (JP); Koma Numata, Osaka (JP); Yohei Noda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 586 days.

(21) Appl. No.: 17/780,252

(22) PCT Filed: Dec. 9, 2020

(86) PCT No.: PCT/JP2020/045774
§ 371 (c)(1),
(2) Date: May 26, 2022

(87) PCT Pub. No.: WO2021/131689
PCT Pub. Date: Jul. 1, 2021

(65) Prior Publication Data

US 2022/0416255 A1 Dec. 29, 2022

(30) Foreign Application Priority Data

Dec. 24, 2019 (JP) ................................ 2019-232469

(51) Int. Cl.
*H01M 4/86* (2006.01)
*H01M 4/90* (2006.01)

(52) U.S. Cl.
CPC ....... *H01M 4/8605* (2013.01); *H01M 4/8652* (2013.01); *H01M 4/9016* (2013.01)

(58) Field of Classification Search
CPC ........ H01M 8/10; H01M 8/02; H01M 8/0232; H01M 8/0245; H01M 8/12; H01M 4/8605;
(Continued)

(56) References Cited

U.S. PATENT DOCUMENTS 6,465,133 B1 * 10/2002 Kariya .................... H01M 4/80 428/560
2013/0032137 A1 * 2/2013 Ruffini .................. C03C 27/046 428/596
(Continued)

FOREIGN PATENT DOCUMENTS

CN 107925092 A 4/2018
JP H11-154517 A 6/1999
(Continued)

OTHER PUBLICATIONS

Garcia, Juan C., et al. "Surface structure, morphology, and stability of Li (Ni1/3Mn1/3Co1/3) O2 cathode material." The Journal of Physical Chemistry C 121.15 (2017): 8290-8299. (Year: 2017).*

*Primary Examiner* — Helen Oi K Conley
*Assistant Examiner* — Amanda Rosenbaum
(74) *Attorney, Agent, or Firm* — Oliff PLC

(57) ABSTRACT

A porous body including a framework having a three-dimensional network structure, the framework having a body including nickel, cobalt, a first element and a second element as constituent elements, the cobalt having a proportion in mass of 0.2 or more and 0.8 or less relative to a total mass of the nickel and the cobalt, the first element including of at least one element selected from the group including of boron, iron and calcium, the second element including of at least one element selected from the group consisting of sodium, magnesium, aluminum, silicon, potassium, titanium, chromium, copper, zinc and tin, the first and
(Continued)

second elements together having a proportion in mass of 5 ppm or more and 50,000 ppm or less in total relative to the body of the framework.

15 Claims, 7 Drawing Sheets

(58) Field of Classification Search
CPC .... H01M 4/8652; H01M 4/9016; H01M 4/86; H01M 4/02; C22C 19/03; C22C 19/05; C22C 19/07
See application file for complete search history.

(56) References Cited

U.S. PATENT DOCUMENTS

| | | | | |
|---|---|---|---|---|
| 2013/0089806 | A1* | 4/2013 | Hiraiwa | H01M 8/122 204/260 |
| 2013/0101900 | A1* | 4/2013 | Nagai | H01M 4/525 429/223 |
| 2013/0266862 | A1 | 10/2013 | Okuno et al. | |
| 2013/0295459 | A1 | 11/2013 | Nishimura et al. | |
| 2015/0194692 | A1* | 7/2015 | Miura | H01M 4/8605 429/482 |
| 2017/0005345 | A1 | 1/2017 | Lee et al. | |
| 2017/0133699 | A1* | 5/2017 | Hiraiwa | H01M 4/905 |
| 2018/0030607 | A1* | 2/2018 | Okuno | C25D 1/08 |
| 2018/0219232 | A1* | 8/2018 | Okuno | H01M 8/0232 |
| 2020/0350600 | A1 | 11/2020 | Numata et al. | |
| 2020/0377973 | A1 | 12/2020 | Okuno et al. | |
| 2021/0175520 | A1 | 6/2021 | Numata et al. | |

FOREIGN PATENT DOCUMENTS

| | | | |
|---|---|---|---|
| JP | 2012-132083 | A | 7/2012 |
| JP | 2012-149282 | A | 8/2012 |
| JP | 2016-015217 | A | 1/2016 |
| JP | 2017-507452 | A | 3/2017 |
| WO | 2019/050301 | A1 | 3/2019 |
| WO | 2019/163256 | A1 | 8/2019 |
| WO | 2019/244480 | A1 | 12/2019 |
| WO | 2020/235265 | A1 | 11/2020 |

* cited by examiner

POROUS BODY AND FUEL CELL INCLUDING THE SAME

TECHNICAL FIELD

The present disclosure relates to a porous body and a fuel cell including the same. The present application claims priority based on Japanese Patent Application No. 2019-232469 filed on Dec. 24, 2019. The disclosure in the Japanese patent application is entirely incorporated herein by reference.

BACKGROUND ART

Conventionally, porous bodies such as porous metal bodies have a high porosity and hence a large surface area, and thus have been used in various applications such as battery electrodes, catalyst carriers, metal composite materials, and filters.

CITATION LIST

Patent Literature

PTL 1: Japanese Patent Laying-Open No. 11-154517
PTL 2: Japanese Patent Laying-Open No. 2012-132083
PTL 3: Japanese Patent Laying-Open No. 2012-149282

SUMMARY OF INVENTION

A porous body according to one aspect of the present disclosure comprises a framework having a three-dimensional network structure, the framework having a body including nickel, cobalt, a first element and a second element as constituent elements, the cobalt having a proportion in mass of 0.2 or more and 0.8 or less relative to a total mass of the nickel and the cobalt, the first element consisting of at least one element selected from the group consisting of boron, iron and calcium, the second element consisting of at least one element selected from the group consisting of sodium, magnesium, aluminum, silicon, potassium, titanium, chromium, copper, zinc and tin, the first and second elements together having a proportion in mass of 5 ppm or more and 50,000 ppm or less in total relative to the mass of the body of the framework.

A fuel cell according to one aspect of the present disclosure is a fuel cell including a current collector for an air electrode and a current collector for a hydrogen electrode, at least one of the current collector for the air electrode or the current collector for the hydrogen electrode including the porous body.

DETAILED DESCRIPTION

Figure 1:
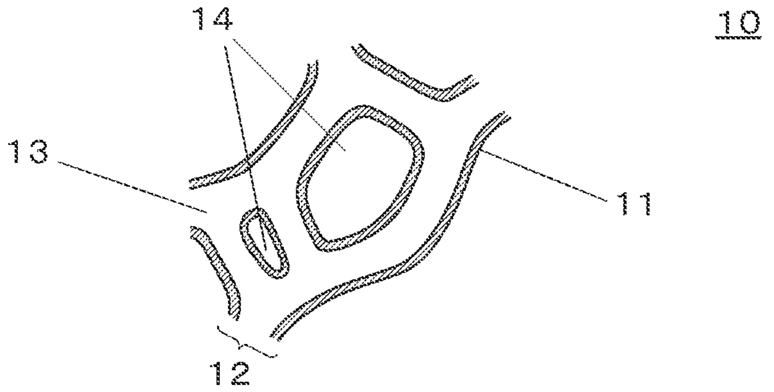
FIG. 1 is a schematic partial cross section generally showing a partial cross section of a framework of a porous body according to one embodiment of the present disclosure.

Problem to be Solved by the Present Disclosure

As such a method for producing a porous metal body, for example, Japanese Patent Laying-Open No, 11-154517 (PTL 1) discloses that after a treatment for imparting conductiveness to a foamed resin or the like, an electroplating layer made of metal is formed on the foamed resin, and the foamed resin is incinerated, as required, and thus removed to produce a porous metal body.

Furthermore. Japanese Patent Laying-Open No. 2012-132083 (PTL 2) discloses a porous metal body having a framework mainly composed of a nickel-tin alloy as a porous metal body having oxidation resistance and corrosion resistance as characteristics. Japanese Patent Laying-Open No. 2012-149282 (PTL 3) discloses a porous metal body having a framework mainly composed of a nickel-chromium alloy as a porous metal body having high corrosion resistance.

As described above, while various types of porous bodies such as a porous metal body are known, using this as a current collector for an electrode for a cell, a solid oxide fuel cell (SOFC) (for example, a current collector for an air electrode and a current collector for a hydrogen electrode), in particular, has room for further improvement, such as adjusting the porous body in strength.

The present disclosure has been made in view of the above circumstances, and contemplates a porous body having appropriate strength as a current collector for an air electrode of a fuel cell and a current collector for a hydrogen electrode of a fuel cell, and a fuel cell including the same.

Advantageous Effect of the Present Disclosure

According to the above, a porous body having appropriate strength as a current collector for an air electrode of a fuel cell and a current collector for a hydrogen electrode of a fuel cell, and a fuel cell including the same.

Description of Embodiments of the Present Disclosure

Initially, embodiments of the present disclosure will be listed and described.

[1] A porous body according to one aspect of the present disclosure comprises a framework having a three-dimensional network structure, the framework having a body including nickel, cobalt, a first element and a second element as constituent elements, the cobalt having a proportion in mass of 0.2 or more and 0.8 or less relative to a total mass of the nickel and the cobalt, the first element consisting of at least one element selected from the group consisting of boron, iron and calcium, the second element consisting of at least one element selected from the group consisting of sodium, magnesium, aluminum, silicon, potassium, titanium, chromium, copper, zinc and tin, the first and second elements together having a proportion in mass of 5 ppm or more and 50,000 ppm or less in total relative to the mass of the body of the framework. The porous body having such a feature can have appropriate strength as a current collector for an air electrode of a fuel cell and a current collector for a hydrogen electrode of a fuel cell.

[2] The cobalt preferably has a proportion in mass of 0.2 or more and 0.45 or less or 0.6 or more and 0.8 or less relative to the total mass of the nickel and the cobalt. The porous body having such a feature can have further appropriate strength as a current collector for an air electrode of a fuel cell and a current collector for a hydrogen electrode of a fuel cell.

[3] The first element preferably has a proportion in mass of 4 ppm or more and 40,000 ppm or less relative to the mass of the body of the framework. The porous body having such a feature can have further appropriate strength as a current collector for an air electrode and a current collector for a hydrogen electrode of a fuel cell.

The second element preferably has a proportion in mass of 1 ppm or more and 10,000 ppm or less relative to the mass of the body of the framework. The porous body having such a feature can have further appropriate strength.

[5] The body of the framework preferably further includes oxygen as a constituent element. This aspect means that the porous body is oxidized as it is used. The porous body in such a state can also maintain high conductivity in a high temperature environment.

[6] The body of the framework preferably includes oxygen in an amount of 0.1% by mass or more and 35% by mass or less. The porous body in this case can more effectively maintain high conductivity in a high temperature environment.

[7] The body of the framework preferably includes a spinel-type oxide. The porous body in this case can also more effectively maintain high conductivity in a high temperature environment.

[8] Preferably, when the body of the framework is observed in cross section at a magnification of 3,000 times to obtain an observed image, the observed image presents in any area 10 μm square thereof five or less voids each having a longer diameter of 1 μm or more. This allows sufficiently increased strength.

[9] The framework is preferably hollow. This allows the porous body to be lightweight and can also reduce an amount of metal required.

[10] The porous body preferably has a sheet-shaped external appearance and has a thickness of 0.2 mm or more and 2 mm or less. As a result, a current collector for an air electrode and a current collector for a hydrogen electrode that are smaller in thickness than conventional can be formed and hence the amount of metal required can be reduced and a compact fuel cell can be manufactured.

[11] A fuel cell according to one aspect of the present disclosure is a fuel cell including a current collector for an air electrode and a current collector for a hydrogen electrode, at least one of the current collector for the air electrode or the current collector for the hydrogen electrode including the porous body. A fuel cell having such a feature can maintain high conductivity in a high temperature environment and hence efficiently generate power.

Detailed Description of Embodiments of the Present Disclosure

Hereinafter, an embodiment of the present disclosure (hereinafter also referred to as "the present embodiment") will be described. It should be noted, however, that the present embodiment is not exclusive. In the present specification, an expression in the form of "A-Z" means a range's upper and lower limits (that is, A or more and Z or less), and when A is not accompanied by any unit and Z is alone accompanied by a unit, A has the same unit as Z.

<<Porous Body>>

A porous body according to the present embodiment is a porous body comprising a framework having a three-dimensional network structure. The framework has a body including nickel, cobalt, a first element and a second element as constituent elements. The cobalt has a proportion in mass of 0.2 or more and 0.8 or less relative to a total mass of the nickel and the cobalt. The first element includes at least one element selected from the group consisting of boron, iron and calcium. The second element includes at least one element selected from the group consisting of sodium, magnesium, aluminum, silicon, potassium, titanium, chromium, copper, zinc and tin. In one aspect of the present embodiment, the first element preferably consists of at least one element selected from the group consisting of boron, iron and calcium. The second element preferably consists of at least one element selected from the group consisting of sodium, magnesium, aluminum, silicon, potassium, titanium, chromium, copper, zinc and tin. The first and second elements together have a proportion in mass of 5 ppm or more and 50,000 ppm or less in total relative to the mass of the body of the framework. The porous body having such a feature can have appropriate strength as a current collector for an air electrode of a fuel cell and a current collector for a hydrogen electrode of a fuel cell. Herein, the "porous body" in the present embodiment for example includes a porous body made of a metal, a porous body made of an oxide of the metal, and a porous body including a metal and an oxide of the metal.

A porous body comprising a framework having a body including cobalt at a proportion of 0.2 or more in mass relative to a total mass of nickel and cobalt included in the body of the framework is high in strength, and even when it is deformed in stacking a SOFC, it tends to be less likely to cause fracture in the framework. When a porous body comprising a framework having a body including cobalt at a proportion of 0.8 or less in mass relative to a total mass of nickel and cobalt included in the body of the framework is used as a current collector for an air electrode or a current collector for a hydrogen electrode to manufacture a fuel cell, a solid electrolyte serving as a constituent member of the fuel cell tends to be less likely to fracture. As such, a porous body comprising a framework having a body including cobalt at a proportion of 0.2 or more and 0.8 or less in mass relative to a total mass of nickel and cobalt included in the body of the framework has appropriate strength as a current collector for an air electrode of a fuel cell and a current collector for a hydrogen electrode of a fuel cell.

The porous body can have an external appearance shaped in a variety of forms, such as a sheet, a rectangular parallelepiped, a sphere, and a cylinder. Inter alfa, the porous body preferably has a sheet-shaped external appearance and has a thickness of 0.2 mm or more and 2 mm or less. The porous body more preferably has a thickness of 0.5 mm or more and 1 mm or less. The porous body having a thickness of 2 mm or less can be smaller in thickness than conventional and can thus reduce the amount of metal required, and allows a compact fuel cell to be manufactured. The porous body having a thickness of 0.2 mm or more can have necessary strength. The thickness can be measured for example with a commercially available digital thickness gauge.

<Framework>

The porous body comprises a framework having a three-dimensional network structure, as has been discussed above. The framework has a body including nickel, cobalt, the first element and the second element as constituent elements. The cobalt has a proportion in mass of 0.2 or more and 0.8 or less relative to a total mass of the nickel and the cobalt.

As shown in FIG. 1, the framework has a three-dimensional network structure having a pore 14. The three-dimensional network structure will more specifically be described hereinafter. A framework 12 is composed of a body 11 including nickel, cobalt, the first element and the second element as constituent elements (hereinafter also referred to as "framework body 11") and a hollow inner portion 13 surrounded by framework body 11. Framework body 11 forms a rib and a node, as will be described hereinafter. Thus, the framework is preferably hollow.

Figure 2:
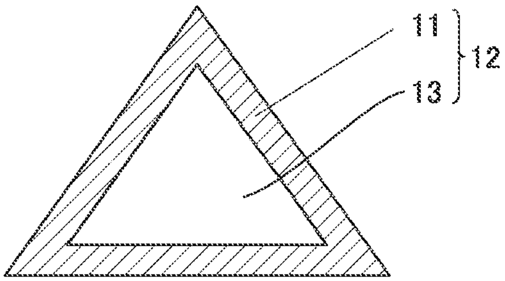
FIG. 2 is a schematic cross section showing a cross section orthogonal to a longitudinal direction of the framework.

Furthermore, as shown in FIG. 2, framework 12 preferably has a triangular cross section orthogonal to its longitudinal direction. However, the cross section of framework 12 should not be limited thereto. The cross section of framework 12 may be a polygonal cross section other than a triangular cross section, such as a quadrangular or hexagonal cross section. In the present embodiment, a "triangle" is a concept including not only a geometrical triangle but also a substantially triangular shape (for example, a shape with a chamfered apex angle, a shape with a rounded apex angle, and the like). The same applies to other polygons. In one aspect of the present embodiment, framework 12 may have a circular cross section.

That is, preferably, framework 12 is such that inner portion 13 surrounded by framework body 11 has a hollow tubular shape, and framework 12 has a triangular or other polygonal, or circular cross section orthogonal to its longitudinal direction. Since framework 12 has a tubular shape, framework body 11 has an inner wall which forms an inner surface of the tube and an outer wall which forms an outer surface of the tube. Framework 12 having framework body 11 surrounding inner portion 13 that is hollow allows the porous body to be significantly lightweight. However, the framework is not limited to being hollow and may instead be solid. Inner portion 13 that is solid allows the porous body to be enhanced in strength.

The framework preferably includes nickel and cobalt such that they have a total apparent weight of 200 g/m$^2$ or more and 1,000 g/m$^2$ or less. The apparent weight is more preferably 250 g/m$^2$ or more and 900 g/m$^2$ or less. As will be described hereinafter, the apparent weight can be appropriately adjusted for example when nickel-cobalt alloy plating is applied on a conductive resin molded body having undergone a conductiveness imparting treatment.

The total apparent weight of nickel and cobalt described above is converted into a mass per unit volume of the framework (or an apparent density of the framework), as follows: That is, the framework has an apparent density preferably of 0.14 g/cm$^3$ or more and 0.75 g/cm$^3$ or less, more preferably 0.18 g/cm$^3$ or more and 0.65 g/cm$^3$ or less. Herein, the "framework's apparent density" is defined by the following expression:

$$\text{Framework's apparent density (g/cm)} = M(\text{g})/V(\text{cm}^3)$$

where M: mass of framework [g], and

V: volume of shape of external appearance of framework [cm$^3$].

The framework has a porosity preferably of 40% or more and 98% or less, more preferably 45% or more and 98% or less, most preferably 50% or more and 98% or less. The framework having a porosity of 40% or more allows the porous body to be significantly lightweight and also have an increased surface area. The framework having a porosity of 98% or less allows the porous body to have sufficient strength.

The framework's porosity is defined by the following expression:

$$\text{Porosity}(\%) = [1 - \{M/(V \times d)\}] \times 100,$$

where M: mass of framework [g],

V: volume of shape of external appearance of framework [cm$^3$], and d: density of substance per se constituting framework [g/cm$^3$].

The framework preferably has an average pore diameter of 60 μm or more and 3.500 μm or less. The framework having an average pore diameter of 60 μm or more can enhance the porous body in strength. The framework having an average pore diameter of 3,500 μm or less can enhance the porous body in bendability (or bending workability). From these viewpoints, the framework has an average pore diameter more preferably of 60 μm or more and 1,000 μm or less, most preferably 100 μm or more and 850 μm or less.

The framework's average pore diameter can be determined in the following method: That is, initially, a microscope is used to observe a surface of the framework at a magnification of 3,000 times to obtain an observed image and at least 10 fields of view thereof are prepared. Subsequently, in each of the 10 fields of view, the number of pores is determined per 1 inch (25.4 mm 25,400 μm) of the framework. Furthermore, the numbers of pores in these 10 fields of view are averaged to obtain an average value ($n_c$) which is in turn substituted into the following expression to calculate a numerical value, which is defined as the framework's average pore diameter:

Average pore diameter (μm)=25,400 μm/$n_c$.

Note that herein the framework's porosity and average pore diameter can also be understood as the porous body's porosity and average pore diameter.

Preferably, when the body of the framework is observed in cross section at a magnification of 3,000 times to obtain an observed image, the observed image presents in any area 10 μm square thereof five or less voids each having a longer diameter of 1 μm or more. In the present embodiment, the "longer diameter" means a longest distance of those between any two points on a perimeter of a void in the observed image. The number of voids is more preferably 3 or less. The porous body can thus sufficiently be enhanced in strength. Furthermore, it is understood that as the number of voids is 5 or less, the body of the framework is different from a formed body obtained by sintering fine powder. The lower limit of the number of voids observed is, for example, zero. Herein, the "number of voids" means an average in number of voids determined by observing each of a plurality of (e.g., 10) "areas 10 μm square" in a cross section of the body of the framework.

The framework can be observed in cross section by using an electron microscope. Specifically, it is preferable to obtain the "number of voids" by observing a cross section of the body of the framework in 10 fields of view. The cross section of the body of the framework may be a cross section orthogonal to the longitudinal direction of the framework (see FIG. 2 for example) or may be a cross section parallel to the longitudinal direction of the framework (see FIG. 1 for example). In the observed image, a void can be distinguished from other parts by contrast in color (or difference in brightness). While the upper limit of the longer diameter of the void should not be limited, it is for example 10,000 μm.

The body of the framework preferably has an average thickness of 10 μm or more and 50 μm or less. Herein, "the framework body's thickness" means a shortest distance from an inner wall, or an interface with the hollow of the inner portion, of the framework to an outer wall located on an external side of the framework. "The framework body's thickness" is obtained at a plurality of locations, and an average value of those thereof is defined as "the framework body's average thickness." The framework body's thickness can be determined by observing a cross section of the framework with an electron microscope.

Specifically, the framework body's average thickness can be determined in the following method: Initially, a sheet-shaped porous body is cut to expose a cross section of the body of the framework. One cross section cut is selected, and enlarged with an electron microscope at a magnification of 3,000 times and thus observed to obtain an observed image. Subsequently, a thickness of any one side of a polygon (e.g., the triangle shown in FIG. 2) forming one framework appearing in the observed image is measured at a center of that side, and defined as the framework body's thickness. Further, such a measurement is done for 10 observed images (or in 10 fields of view of image observed) to obtain the framework body's thickness at 10 points. Finally, the 10 points' average value is calculated to obtain the framework body's average thickness.

(Three-Dimensional Network Structure)

The porous body comprises a framework having a three-dimensional network structure. In the present embodiment, a "three-dimensional network structure" means a structure in the form of a three-dimensional network. The three-dimensional network structure is formed by a framework. Hereinafter, the three-dimensional network structure will more specifically be described.

Figure 3A:
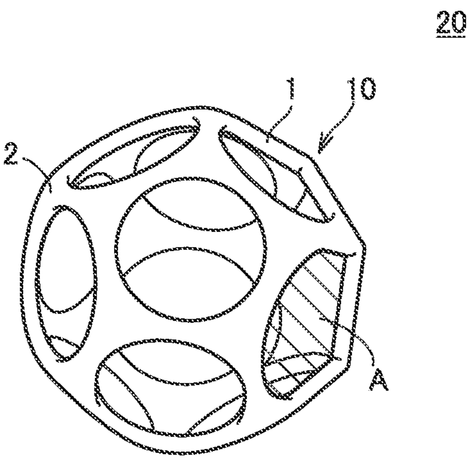
FIG. 3A is an enlarged schematic diagram focusing on one cell in the porous body in order to illustrate a three-dimensional network structure of the porous body according to one embodiment of the present disclosure.
Figure 3B:
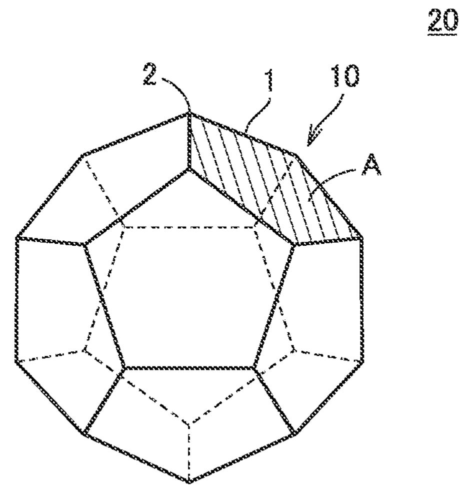
FIG. 3B is a schematic diagram showing an embodiment of a shape of the cell.
Figure 7:
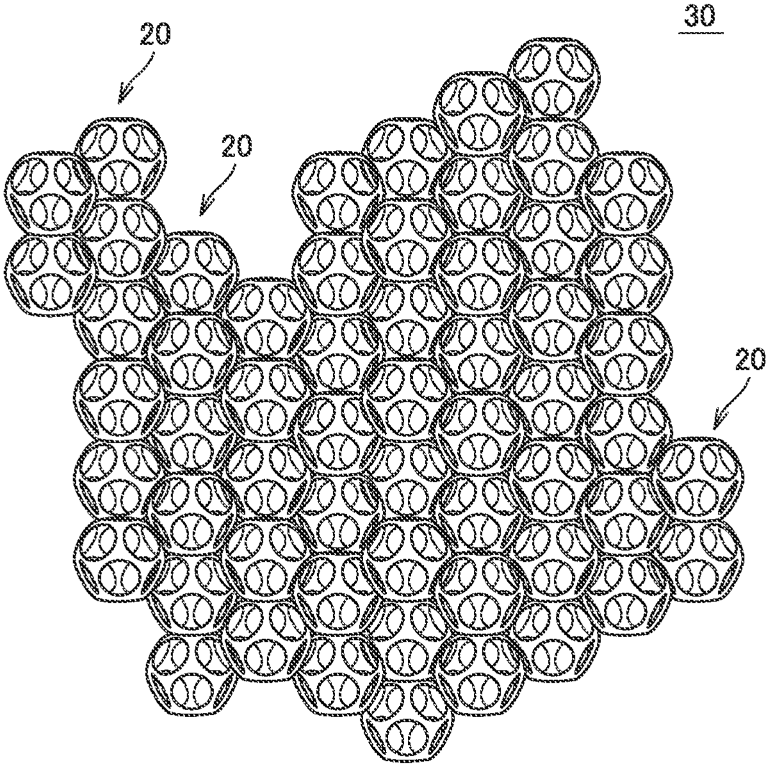
FIG. 7 is a schematic diagram showing one embodiment of a three-dimensional network structure formed by a plurality of cells joined together.

As shown in FIG. 7, a three-dimensional network structure 30 has a cell 20 as a basic unit, and is formed of a plurality of cells 20 joined together. As shown in FIGS. 3A and 3B, cell 20 includes a rib 1 and a node 2 that connects a plurality of ribs 1. Although rib 1 and node 2 are described separately in terminology for the sake of convenience, there is no clear boundary therebetween. That is, a plurality of ribs 1 and a plurality of nodes 2 are integrated together to form cell 20, and cell 20 serves as a constituent unit to form three-dimensional network structure 30. Hereinafter, in order to facilitate understanding, the cell shown in FIG. 3A will be described as the regular dodecahedron shown in FIG. 3B.

Initially, a plurality of ribs 1 and a plurality of nodes 2 are present to form a frame 10 in the form of a planar polygonal structure. While FIG. 3B shows frame 10 having a polygonal structure that is a regular pentagon, frame 10 may be a polygon other than a regular pentagon, such as a triangle, a quadrangle, or a hexagon. Herein, the structure of frame 10 can also be understood such that a plurality of ribs 1 and a plurality of nodes 2 form a planar polygonal aperture. In the present embodiment, the planar polygonal aperture has a diameter, which means a diameter of a circle circumscribing the planar polygonal aperture defined by frame 10. A plurality of frames 10 are combined together to form cell 20 that is a three-dimensional, polyhedral structure. In doing so, one rib 1 and one node 2 are shared by a plurality of frames 10.

As shown in the schematic diagram of FIG. 2 described above, rib 1 preferably has, but is not limited to, a hollow tubular shape and has a triangular cross section. Rib 1 may have a polygonal cross section other than a triangular cross section, such as a quadrangular or hexagonal cross section, or a circular cross section. Node 2 may be shaped to have a vertex to have a sharp edge, the vertex chamfered to have a planar shape, or the vertex rounded to have a curved shape.

Figure 4A:
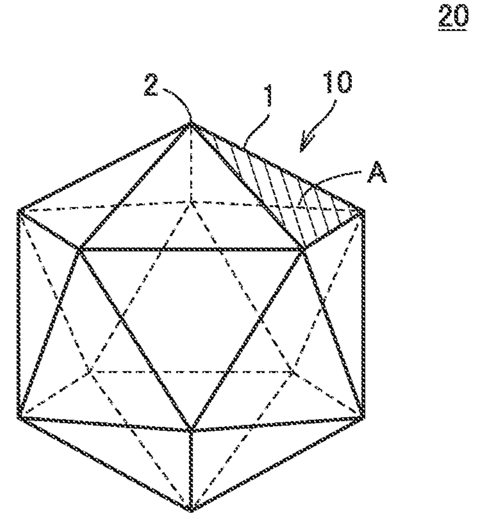
FIG. 4A is a schematic diagram showing another embodiment of the shape of the cell.
Figure 4B:
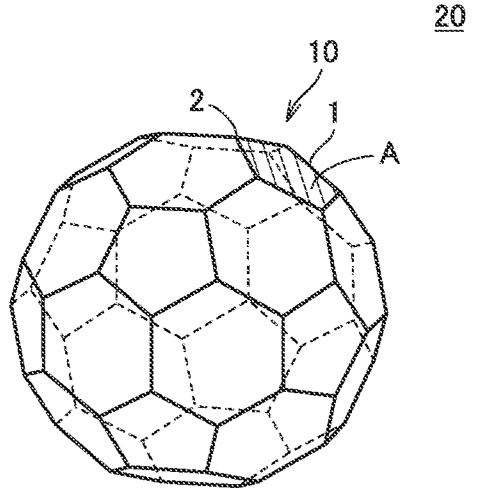
FIG. 4B is a schematic diagram showing still another embodiment of the shape of the cell.

While the polyhedral structure of cell 20 is a dodecahedron in FIG. 3B, it may be other polyhedrons such as a cube, an icosahedron (see FIG. 4A), and a truncated icosahedron (see FIG. 4B). Herein, the structure of cell 20 can also be understood as forming a three-dimensional space (i.e., pore 14) surrounded by a virtual plane A defined by each of a plurality of frame 10. In the present embodiment, it can be understood that the three-dimensional space has a pore with a diameter (hereinafter also referred to as a "pore diameter") which is a diameter of a sphere circumscribing the three-dimensional space defined by cell 20. Note, however, that in the present embodiment the porous body's average pore diameter is calculated based on the above-described calculation formula for the sake of convenience. That is, an average value of the diameters of the pores (or pore diameters) of the three-dimensional spaces defined by cells 20 is regarded as the framework's average pore diameter.

Figure 5:
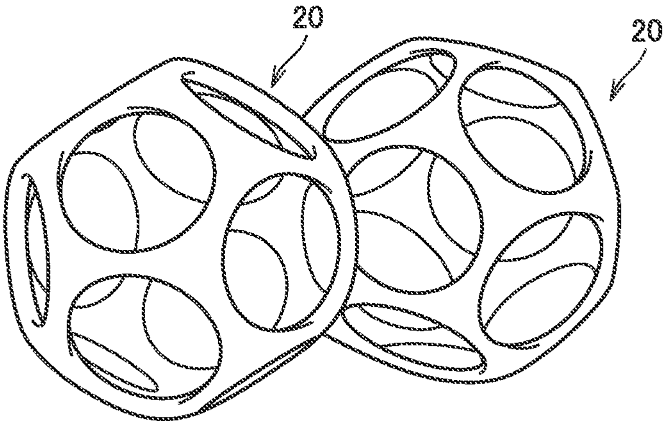
FIG. 5 is a schematic diagram showing two cells joined together.
Figure 6:
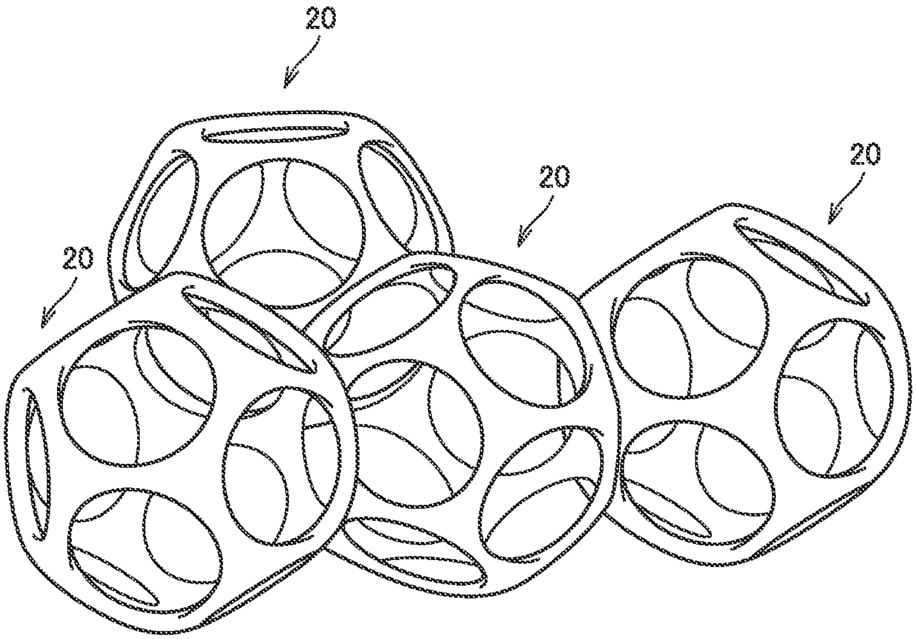
FIG. 6 is a schematic diagram showing four cells joined together.

A plurality of cells 20 are combined together to form three-dimensional network structure 30 (see FIGS. 5 to 7). In doing so, frame 10 is shared by two cells 20. Three-dimensional network structure 30 can also be understood to include frame 10 and can also be understood to include cell 20.

As has been described above, the porous body has a three-dimensional network structure that forms a planar polygonal aperture (or a frame) and a three-dimensional space (or a cell). Therefore, it can be clearly distinguished from a two-dimensional network structure only having a planar aperture (e.g., a punched metal, a mesh, etc.). Furthermore, the porous body has a plurality of ribs and a plurality of nodes integrally forming a three-dimensional network structure, and can thus be clearly distinguished from a structure such as non-woven fabric formed by intertwining fibers serving as constituent units. The porous body having such a three-dimensional network structure can have continuous pores.

In the present embodiment, the three-dimensional network structure is not limited to the above-described structure. For example, the cell may be formed of a plurality of frames each having a different size and a different planar shape. Furthermore, the three-dimensional network structure may be formed of a plurality of cells each having a different size and a different three-dimensional shape. The three-dimensional network structure may partially include a frame without having a planar polygonal aperture therein or may partially include a cell without having a three-dimensional space therein (or a cell having a solid interior).

(Nickel and Cobalt)

The framework has a body including nickel, cobalt, the first element and the second element as constituent elements, as has been discussed above. The body of the framework does not exclude including a component other than nickel, cobalt, the first element and the second element unless the component affects the presently disclosed porous body's function and effect. In one aspect of the present embodiment, the body of the framework preferably includes the above four components (nickel, cobalt, the first element and the second element) as a metal component. Specifically, the body of the framework preferably includes a nickel-cobalt alloy composed of nickel and cobalt, and the first and second elements. The nickel-cobalt alloy is preferably a major component of the body of the framework. Herein, a "major component" of the body of the framework refers to a component having the largest proportion in mass in the body of the framework. More specifically, when the body of the framework contains a component at a proportion in mass exceeding 50% by mass, the component is referred to as a major component of the body of the framework, The nickel and cobalt in the body of the framework preferably have a proportion in mass of 80% by mass or more, more preferably 90% by mass or more, still more preferably 95% by mass or more in total relative to the mass of the body of the framework for example before the porous body is used as a current collector for an air electrode for an SOFC or a current collector for a hydrogen electrode for the SOFC, that is, before the porous body is exposed to a high temperature of 700° C. or higher. The proportion in mass of nickel and cobalt in total may have an upper limit of less than 100% by mass, 99% by mass or less, or 95% by mass or less relative to the mass of the body of the framework.

When a porous body comprising a framework having a body containing nickel and cobalt at a higher proportion in mass in total is used as a current collector for an air electrode for an SOFC or a current collector for a hydrogen electrode for the SOFC, a proportion of a generated oxide being a spinel-type oxide composed of nickel and/or cobalt and oxygen, tends to increase. Thus, the porous body can maintain high conductivity even when used in a high temperature environment.

(Proportion in Mass of Cobalt Relative to Total Mass of Nickel and Cobalt)

The cobalt has a proportion in mass of 0.2 or more and 0.8 or less relative to a total mass of the nickel and the cobalt. When a porous body comprising a framework having such a composition is used as a current collector for an air electrode or a hydrogen electrode of an SOFC or the like, a spinel-type oxide represented by a chemical formula of $Ni_{3-x}Co_xO_4$, where $0.6 \leq x \leq 2.4$, typically $NiCo_2O_4$ or $Ni_2CoO_4$, is generated in the framework by oxidation. As the body of the framework is oxidized, a spinel-type oxide represented by the chemical formula of $CoCo_2O_4$ may also be generated. The spinel-type oxide exhibits high conductivity, and the porous body can hence maintain high conductivity even when the body of the framework is entirely oxidized as the porous body is used in a high temperature environment.

The cobalt preferably has a proportion in mass of 0.2 or more and 0.45 or less or 0.6 or more and 0.8 or less, more preferably 0.2 or more and 0.45 or less relative to the total mass of the nickel and the cobalt. The porous body comprising a framework having a body including cobalt at a proportion of 0.6 or more and 0.8 or less in mass relative to the total mass of nickel and cobalt is further higher in strength, and even when it is deformed in stacking a SOFC, it tends to be further less likely to cause fracture in the body of the framework. When the porous body comprising a framework having a body including cobalt at a proportion of 0.2 or more and 0.45 or less in mass relative to the total mass of nickel and cobalt is used as a current collector for an air electrode or a current collector for a hydrogen electrode to manufacture a fuel cell, a solid electrolyte that is a constituent member of the fuel cell tends to be less likely to fracture.

(Oxygen)

The body of the framework preferably further includes oxygen as a constituent element. Specifically, the body of the framework more preferably includes oxygen in an amount of 0.1% by mass or more and 35% by mass or less. The oxygen in the body of the framework can be detected, for example, after the porous body is used as a current collector for an air electrode or a hydrogen electrode of an SOFC. That is, preferably, after the porous body is exposed to a temperature of 700° C. or higher, the body of the framework includes oxygen in an amount of 0.1% by mass or more and 35% by mass or less. More preferably, the body of the framework includes oxygen in an amount of 10% by mass or more and 30% by mass or less, still more preferably 25% by mass or more and 28% by mass or less.

When the body of the framework includes oxygen as a constituent element in an amount of 0.1% by mass or more and 35% by mass or less, a thermal history that the porous body has been exposed to a high temperature of 700° C. or higher can be inferred. Furthermore, when the porous body is used as a current collector for an air electrode or a hydrogen electrode of an SOFC or the like and thus exposed to a high temperature of 700° C. or higher, and a spinel-type oxide composed of nickel and/or cobalt and oxygen is generated in the framework, the body of the framework tends to include oxygen as a constituent element in an amount of 0.1% by mass or more and 35% by mass or less.

That is, the body of the framework preferably includes a spinel-type oxide. Thus, the porous body can maintain high conductivity more effectively even when it is oxidized. When the body of the framework contains oxygen at a proportion in mass departing the above range, the porous body tends to fail to obtain an ability as desired to maintain high conductivity more effectively when it is oxidized.

(First Element)

The first element includes at least one element selected from the group consisting of boron, iron and calcium. The first element preferably consists of at least one element selected from the group consisting of boron, iron and calcium. The first element is believed to be present at a grain boundary of a crystal grain including nickel and cobalt. The present inventors consider that the first element present at the grain boundary of the crystal grain suppresses coarsening of the crystal grain and hence enhances the body of the framework in hardness (or strength).

The first element preferably has a proportion in mass of 4 ppm or more and 40,000 ppm or less, more preferably 20 ppm or more and 10,000 ppm or less relative to the mass of the body of the framework. When the first element is included as a plurality of types thereof, a proportion in mass of the first element means a total of proportions in mass of the plurality of types of the element. The first element's proportion in mass can be determined using an EDX device (energy dispersive X-ray analyzer) described hereinafter.

(Second Element)

The second element includes at least one element selected from the group consisting of sodium, magnesium, aluminum, silicon, potassium, titanium, chromium, copper, zinc and tin. The second element preferably consists of at least one element selected from the group consisting of sodium, magnesium, aluminum, silicon, potassium, titanium, chromium, copper, zinc and tin. The second element is believed to be present at a grain boundary of a crystal grain including nickel and cobalt. The present inventors consider that the second element present at the grain boundary of the crystal grain suppresses coarsening of the crystal grain and hence enhances the body of the framework in hardness (or strength), It is believed that the second element included in the body of the framework together with the first element prevents grain boundary diffusion of the first element. On the other hand, it is believed that the first element included in the body of the framework together with the second element prevents grain boundary diffusion of the second element. In other words, the present inventors consider that the first and second elements together included in the body of the framework prevent grain boundary diffusion of the two elements, and hence efficiently suppress coarsening of the crystal grain.

The second element preferably has a proportion in mass of 1 ppm or more and 10,000 ppm or less, more preferably 1 ppm or more and 5,000 ppm or less relative to the mass of the body of the framework. When the second element is included as a plurality of types thereof, a proportion in mass of the second element means a total of proportions in mass of the plurality of types of the element. The second element's proportion in mass can be determined using the EDX device described hereinafter.

In one aspect of the present embodiment, the first element may be boron, and the second element may be at least one element selected from the group consisting of sodium, aluminum, zinc, and tin. The first element may be iron, and the second element may be at least one element selected from the group consisting of magnesium, copper, potassium, and aluminum. The first element may be calcium, and the second element may be at least one element selected from the group consisting of sodium, tin, chromium, titanium, and silicon, In one aspect of the present embodiment, the first element may be boron and calcium, and the second element may be sodium, aluminum and silicon. The first element may be boron and iron, and the second element may be magnesium and tin. The first element may be boron, iron and calcium, and the second element may be sodium, aluminum, silicon and tin.

The first and second elements together have a proportion in mass of 5 ppm or more and 50,000 ppm or less, preferably 10 ppm or more and 10,000 ppm or less, preferably 55 ppm or more and 477 ppm or less, relative to the mass of the body of the framework. When the first element is included as a plurality of types thereof, a mass of the first element means a total in mass of the plurality of types of the element. The second element is similarly discussed.

(Another Component)

The body of the framework can include another component as a constituent element, as described above, insofar as it does not affect a function and effect that the presently disclosed porous body has. The framework may include, for example, carbon, tungsten, phosphorus, silver, mold, molybdenum, nitrogen, sulfur, fluorine, chlorine, and the like as the other component. Further, the body of the framework may include oxygen as the other component in a state before the porous body is used as a current collector for an air electrode for an SOFC or a current collector for a hydrogen electrode for the SOFC. The body of the framework preferably includes the other component individually in an amount of 5% by mass or less, and such other components together in an amount of 10% by mass or less.

In one aspect of the present embodiment, the body of the framework may further include at least one non-metallic element selected from the group consisting of nitrogen, sulfur, fluorine, and chlorine as a constituent element. The non-metallic element may have a total proportion in mass of 5 ppm or more and 10,000 ppm or less relative to the mass of the body of the framework. Preferably, the non-metallic element has a total proportion in mass of 10 ppm or more and 8,000 ppm or less relative to the mass of the body of the framework.

Further, the body of the framework may further include phosphorus as a constituent element. The phosphorus may have a proportion in mass of 5 ppm or more and 50,000 ppm or less relative to the mass of the body of the framework. Preferably, the phosphorus has a proportion in mass of 10 ppm or more and 40,000 ppm or less relative to the mass of the body of the framework.

In another aspect of the present embodiment, the body of the framework may further include at least two non-metallic elements selected from the group consisting of nitrogen, sulfur, fluorine, chlorine, and phosphorus as constituent elements. The non-metallic elements may have a total proportion in mass of 5 ppm or more and 50,000 ppm or less relative to the mass of the body of the framework. Preferably, the non-metallic elements have a total proportion in mass of 10 ppm or more and 10,000 ppm or less relative to the mass of the body of the framework.

When the porous body is used as a current collector for an air electrode or a hydrogen electrode of a SOFC, it is exposed to a high environmental temperature of 700° C. or higher, as has been set forth above. However, the body of the framework includes the above-described non-metallic element as a constituent element, and the porous body can maintain appropriate strength.

(Method for Measuring a Proportion in Mass of Each Element)

The proportion in mass of each element (e.g., oxygen) in the body of the framework (in % by mass) can be determined as follows: an image of a cross section of the framework cut, as observed through a scanning electron microscope (SEM), can be analyzed with an EDX device accompanying the SEM (for example, an SEM part: trade name "SUPRA35VP" manufactured by Carl Zeiss Microscopy Co., Ltd., and an EDX part: trade name "octane super" manufactured by AMETEK, Inc.) to determine the proportion in mass of each element contained in the body of the framework. The EDX device can also be used to determine a proportion in mass of nickel, cobalt, the first element and the second element in the body of the framework. Specifically, based on the atomic concentration of each element detected by the EDX device, nickel, cobalt, the first element and the second element in % by mass, mass ratio, and the like in the body of the framework can be determined. When the body of the framework includes oxygen, the mass % of the oxygen in the body of the framework can also be determined in the same manner. Further, whether the body of the framework has a spinel-type oxide composed of nickel and/or cobalt and oxygen can be determined by exposing the cross section to an X-ray and analyzing its diffraction pattern, i.e., by X-ray diffractometry (XRD).

For example, whether the body of the framework has a spinel-type oxide can be determined using a measurement device such as an X-ray diffractometer (for example, trade name (model number): “Empyrean” manufactured by Spectris, and analysis software: “integrated X-ray powder diffraction software PDXL”). The measurement may be done for example under the following conditions:

(Measurement Conditions)

X-ray diffractometry: θ-2θ method
Measuring system: collimated beam optical mirror
Scan range (2θ): 10° to 90°
cumulative time: 1 second/step
step: 0.03°.

<<Fuel Cell>>

A fuel cell according to the present embodiment is a fuel cell comprising a current collector for an air electrode and a current collector for a hydrogen electrode. At least one of the current collector for the air electrode or the current collector for the hydrogen electrode includes the porous body. The current collector for the air electrode or the current collector for the hydrogen electrode includes a porous body having appropriate strength as a current collector for a fuel cell, as described above. The current collector for the air electrode or the current collector for the hydrogen electrode is thus suitable as at least one of a current collector for an air electrode of an SOC or a current collector for a hydrogen electrode of the SOFC. For the fuel cell, it is more suitable to use the porous body as the current collector for the air electrode as the porous body includes nickel, cobalt, the first element and the second element.

Figure 8:
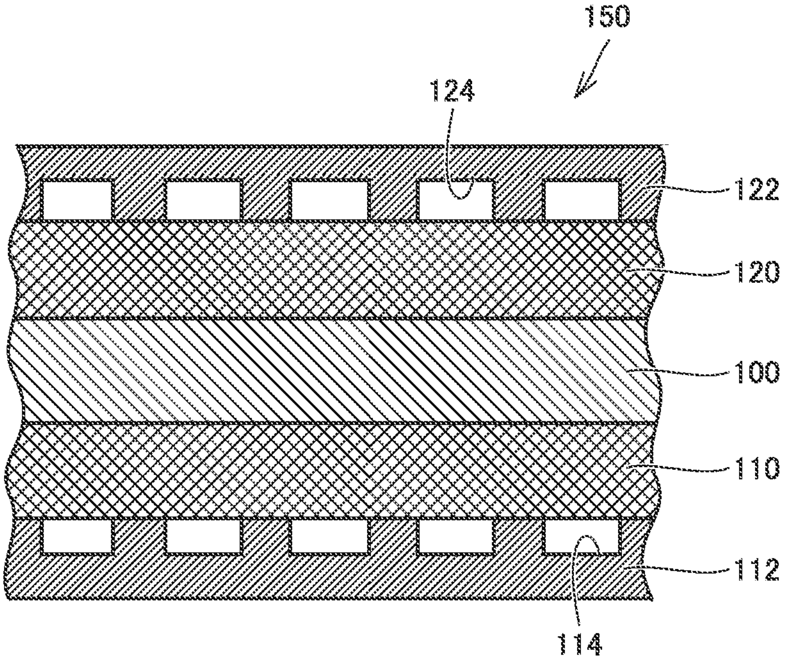
FIG. 8 is a schematic cross section of a fuel cell according to an embodiment of the present disclosure.

FIG. 8 is a schematic cross section of a fuel cell according to an embodiment of the present disclosure. A fuel cell 150 comprises a current collector 110 for a hydrogen electrode, a current collector 120 for an air electrode, and a cell 100 for the fuel cell. Cell 100 for the fuel cell is provided between current collector 110 for the hydrogen electrode and current collector 120 for the air electrode. Herein a “current collector for a hydrogen electrode” means a current collector on a side in a fuel cell that supplies hydrogen. A “current collector for an air electrode” means a current collector on a side in the fuel cell that supplies a gas (e.g., air) containing oxygen.

Figure 9:
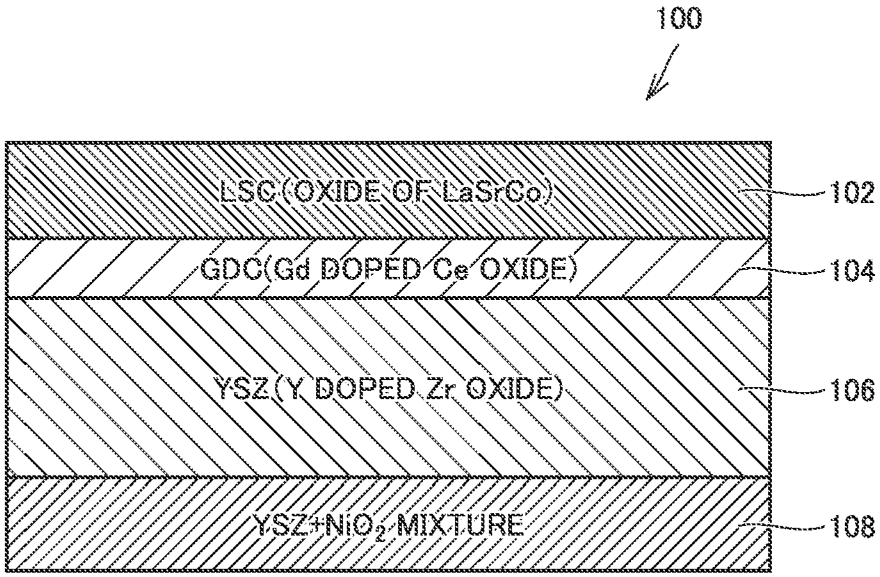
FIG. 9 is a schematic cross section of a cell for a fuel cell according to an embodiment of the present disclosure.

FIG. 9 is a schematic cross section of a cell for a fuel cell according to an embodiment of the present disclosure. Cell 100 for the fuel cell includes an air electrode 102, a hydrogen electrode 108, an electrolyte layer 106 provided between air electrode 102 and hydrogen electrode 108, and an intermediate layer 104 provided between electrolyte layer 106 and air electrode 102 to prevent a reaction therebetween. As the air electrode, for example, an oxide of LaSrCo (LSC) is used. As the electrolyte layer, for example, an oxide of Zr doped with Y (YSZ) is used. As the intermediate layer, for example, an oxide of Ce doped with Gd (GDC) is used. As the hydrogen electrode, for example, a mixture of YSZ and $NiO_2$ is used.

Fuel cell 150 further comprises a first interconnector 112 having a fuel channel 114 and a second interconnector 122 having an oxidant channel 124. Fuel channel 114 is a channel for supplying fuel (for example, hydrogen) to hydrogen electrode 108. Fuel channel 114 is provided on a major surface of first interconnector 112 that faces current collector 110 for the hydrogen electrode. Oxidant channel 124 is a channel for supplying an oxidant (for example, oxygen) to air electrode 102. Oxidant channel 124 is provided on a major surface of second interconnector 122 that faces current collector 120 for the air electrode.

<<Method for Producing Porous Body>>

The porous body according to the present embodiment can be produced by appropriately using a conventionally known method. For this reason, while the method for producing the porous body should not be specifically limited, preferably, it is the following method:

That is, preferably, the porous body is produced in a method for producing a porous body, comprising: forming a conductive coating layer on a resin molded body having a three-dimensional network structure to obtain a conductive resin molded body (a first step); plating the conductive resin molded body with a nickel-cobalt alloy to obtain a porous body precursor (a second step); and applying a heat treatment to the porous body precursor to incinerate a resin component in the conductive resin molded body and thus remove the resin component to obtain the porous body (a third step). Herein, in the present embodiment, a “nickel-cobalt alloy” means an alloy which includes nickel and cobalt as major components and can include another element (for example, an alloy including nickel and cobalt as major components and also including the first element and the second element).

<First Step>

Initially, a sheet of a resin molded body having a three-dimensional network structure (hereinafter also simply referred to as a “resin molded body”) is prepared. Polyurethane resin, melamine resin, or the like can be used as the resin molded body. Furthermore, as a conductiveness imparting treatment for imparting conductiveness to the resin molded body, a conductive coating layer is formed on a surface of the resin molded body. The conductiveness imparting treatment can for example be the following method:

(1) applying a conductive paint containing carbon, conductive ceramic or similarly conductive particles and a binder to the resin molded body, impregnating the resin molded body with the conductive paint, or the like to include the conductive paint in a surface of the resin molded body;
(2) forming a layer of a conductive metal such as nickel and copper on a surface of the resin molded body by electroless plating; and
(3) forming a layer of a conductive metal on a surface of the resin molded body by vapor deposition or sputtering. A conductive resin molded body can thus be obtained.

<Second Step>

Subsequently, the conductive resin molded body is plated with a nickel-cobalt alloy to obtain a porous body precursor. While the conductive resin molded body can be plated with a nickel-cobalt alloy by electroless plating, electrolytic plating (so-called alloy electroplating) is preferably used from the viewpoint of efficiency. In nickel-cobalt alloy electroplating, the conductive resin molded body is used as a cathode.

Nickel-cobalt alloy electroplating can be done using a known plating bath. For example, a watt bath, a chloride bath, a sulfamic acid bath, or the like can be used. Nickel-cobalt alloy electroplating can be done with a plating bath having a composition for example as follows:

(Bath Composition)

Salt (aqueous solution): Nickel sulfamate and cobalt sulfamate (350 to 450 g/L as the total amount of Ni and Co)
Note: The ratio in mass of Ni and that in mass of Co are adjusted from Co/(Ni+Co)=0.2 to 0.8 by the ratio in mass of Co to the total mass of Ni and Co as desired.
Salt including the first element as a constituent element
Salt including the second element as a constituent element
Boric acid: 30-40 g/L pH: 4-4.5.

Examples of the salt including the first element as a constituent element include $Na_2B_4O_5(OH)_4.8H_2O$, $FeSO_4.7H_2O$, and $CaSO_4.2H_2O$.

Examples of the salt including the second element as a constituent element include $Na_2SO_4$, $Al_2(SO_4)_3$, $Na_2SiO_3$, $MgSO_4$, $CuSO_4.5H_2O$, $K_2SO_4$, $SnSO_4$, $Cr_2(SO_4)_3 \cdot nH_2O$, $Ti(SO_4)_2$ and $ZnSO_4.7H_2O$.

The electrolytic plating with the nickel-cobalt alloy can be done through electrolysis for example under the following conditions:

(Conditions for Electrolysis)

Temperature: 40-60° C.

Current density: 0.5 to 10 A/dm$^2$

Anode: insoluble anode.

A porous body precursor having a conductive resin molded body plated with a nickel-cobalt alloy can thus be obtained. In addition, when adding a non-metallic element such as nitrogen, sulfur, fluorine, chlorine, and phosphorus, a variety of types of additives can be introduced into the plating bath to cause the porous body precursor to contain them. Examples of the variety of types of additives include, but are not limited to, sodium nitrate, sodium sulfate, sodium fluoride, sodium chloride, and sodium phosphate, and it is sufficient that each non-metallic element is included.

<Third Step>

Subsequently, the porous body precursor is subjected to a heat treatment to incinerate a resin component in the conductive resin molded body and remove the resin component to obtain the porous body. Thus a porous body having a framework having a three-dimensional network structure can be obtained. The heat treatment for removing the resin component may be done for example at a temperature of 600° C. or higher in an atmosphere which is an oxidizing atmosphere such as air.

Herein, the porous body obtained in the above method has an average pore diameter substantially equal to that of the resin molded body. Accordingly, the average pore diameter of the resin molded body used to obtain the porous body may be selected, as appropriate, depending on the application of the porous body. As the porous body has a porosity ultimately determined by the amount (the apparent weight) of the plating metal, the apparent weight of the plating nickel-cobalt alloy may be selected as appropriate depending on the porosity required for the porous body as a final product. The resin molded body's porosity and average pore diameter are defined in the same manner as the above described framework's porosity and average pore diameter, and can be determined based on the above calculation formula with the term "framework" replaced with the term "resin molded body."

Through the above steps, the porous body according to the present embodiment can be produced. The porous body comprises a framework having a three-dimensional network structure, and the framework has a body including nickel, cobalt, the first element and the second element as constituent elements. Furthermore, the cobalt has a proportion in mass of 0.2 or more and 0.8 or less relative to the total mass of the nickel and the cobalt. The first element includes at least one element selected from the group consisting of boron, iron and calcium, the second element includes at least one element selected from the group consisting of sodium, magnesium, aluminum, silicon, potassium, titanium, chromium, copper, zinc and tin, and the first and second elements together have a proportion in mass of 5 ppm or more and 50,000 ppm or less in total relative to the body of the framework. The porous body can thus have appropriate strength as a current collector for an air electrode or a hydrogen electrode of a fuel cell.

What has been described above includes features indicated in the following additional notes.

(Additional Note 1)

A porous body comprising a framework having a three-dimensional network structure, the framework having a body including nickel, cobalt, a first element and a second element as constituent elements, the cobalt having a proportion in mass of 0.2 or more and 0.8 or less relative to a total mass of the nickel and the cobalt, the first element including at least one element selected from the group consisting of boron, iron and calcium, the second element including at least one element selected from the group consisting of sodium, magnesium, aluminum, silicon, potassium, titanium, chromium, copper, zinc and tin, the first and second elements together having a proportion in mass of 5 ppm or more and 50,000 ppm or less in total relative to the mass of the body of the framework, (Additional Note 2)

The porous body according to Additional Note 1, wherein the cobalt has a proportion in mass of 0.2 or more and 0.45 or less relative to the total mass of the nickel and the cobalt.

(Additional Note 3)

The porous body according to Additional Note 1, wherein the first and second elements together have a proportion in mass of 55 ppm or more and 477 ppm or less relative to the mass of the body of the framework.

(Additional Note 4)

The porous body according to Additional Note 1, wherein in the body of the framework the nickel and the cobalt together have a proportion in mass of 80% by mass or more and less than 100% by mass in total.

(Additional Note 5)

The porous body according to Additional Note 1, wherein the first element is boron, and the second element is at least one element selected from the group consisting of sodium, aluminum, zinc, and tin.

(Additional Note 6)

The porous body according to Additional Note 1, wherein the first element is iron, and the second element is at least one element selected from the group consisting of magnesium, copper, potassium, and aluminum.

(Additional Note 7)

The porous body according to Additional Note 1, wherein the first element is calcium, and the second element is at least one element selected from the group consisting of sodium, tin, chromium, titanium, and silicon.

(Additional Note 8)

The porous body according to Additional Note 1, wherein the first element is boron and calcium, and the second element is sodium, aluminum and silicon.

(Additional Note 9)

The porous body according to Additional Note 1, wherein the first element is boron and iron, and the second element is magnesium and tin.

(Additional Note 10)

The porous body according to Additional Note 1, wherein the first element is boron, iron and calcium, and the second element is sodium, aluminum, silicon and tin,

EXAMPLES

Hereinafter, the present invention will more specifically be described with reference to examples although the present invention is not limited thereto.

<<Preparing the Porous Body>>

<Samples 1 to 12>

Porous bodies for Samples 1 to 12 were produced through the following procedure:

(First Step)

Initially, a 1.5 mm thick polyurethane resin sheet was prepared as a resin molded body having a three-dimensional network structure. When this polyurethane resin sheet's porosity and average pore diameter were determined based on the above formula, the porosity was 96% and the average pore diameter was 450 μm.

Subsequently, the resin molded body was impregnated with a conductive paint (slurry including carbon black), and then squeezed with a roll and dried to form a conductive coating layer on a surface of the resin molded body. A conductive resin molded body was thus obtained.

(Second Step)

Using the conductive resin molded body as a cathode, electrolytic plating was performed with a bath composition under conditions for electrolysis, as indicated below. As a result, 660 g/m$^2$ of a nickel-cobalt alloy was deposited on the conductive resin molded body, and a porous body precursor was thus obtained.

<Bath Composition>

Salt (aqueous solution): aqueous solution of nickel sulfamate and cobalt sulfamate: The total amount of Ni and Co was 400 g/L.

The proportion in mass of Co/(Ni+Co) was 0.22, 0.58 or 0.78.

$Na_2B_4O_5(OH)_4.8H_2O$ was added to the plating bath so that as the first element, boron was included in a porous body at a proportion in mass as shown in table 1.

$Na_2SO_4$, $Al_2(SO_4)_3$, $ZnSO_4.7H_2O$ or $SnSO_4$ was added to the plating bath so that as the second element, sodium, aluminum, zinc or tin was included in a porous body at a proportion in mass as shown in table 1.

Boric acid: 35 g/L, pH: 4.5.

<Conditions for Electrolysis>

Temperature: 50° C.

Current density: 5 A/dm$^2$

Anode: Insoluble anode.

(Third Step)

The porous body precursor was subjected to a heat treatment to incinerate a resin component in the conductive resin molded body and remove the resin component to obtain a porous body for each of samples 1 to 12. The heat treatment for removing the resin component was done at a temperature of 650° C. in an atmosphere of air.

<Samples 13 to 24>

Except that in the second step, $FeSO_47H_2O$ was added to the plating bath so that as the first element, iron was included in a porous body at a proportion in mass as shown in table 1 and $MgSO_4$, $CuSO_4.5H_2O$, $K_2SO_4$ or $Al_2(SO_4)_3$ was added to the plating bath so that as the second element, magnesium, copper, potassium or aluminium was included in the porous body at a proportion in mass as shown in table 1, porous bodies for Samples 13 to 24 were produced in the same manner as <Samples 1 to 12>.

<Samples 25 to 36>

Except that in the second step, $CaSO_4.2H_2O$ was added to the plating bath so that as the first element, calcium was included in a porous body at a proportion in mass as shown in table 2 and $Na_2SO_4$, $SnSO_4$, $Cr_2(SO_4)_3.nH_2O$ or $Ti(SO_4)_2$ was added to the plating bath so that as the second element, sodium, tin, chromium or titanium was included in the porous body at a proportion in mass as shown in table 2, porous bodies for Samples 25 to 36 were produced in the same manner as <Samples 1 to 12>, <Samples 37 to 39>

Except that in the second step, $CaSO_4.2H_2O$ was added to the plating bath so that as the first element, calcium was included in a porous body at a proportion in mass as shown in table 2 and $Na_2SiO_3$ was added to the plating bath so that as the second element, silicon and sodium were included in the porous body at a proportion in mass as shown in table 2, porous bodies for Samples 37 to 39 were produced in the same manner as <Samples 1 to 12>, <Samples 40 to 42>

Except that in the second step, $Na_2B_4O_5(OH)_4.8H_2O$ and $CaSO_4.2H_2O$ were added to the plating bath so that as the first element, boron and calcium were included in a porous body at a proportion in mass as shown in table 3 and $Al_2(SO_4)_3$ and $Na_2SiO_3$ were added to the plating bath so that as the second element, aluminium, silicon and sodium were included in the porous body at a proportion in mass as shown in table 3, porous bodies for Samples 40 to 42 were produced in the same manner as <Samples 1 to 12>.

<Samples 43 to 45>

Except that in the second step, $Na_2B_4O_5(OH)_4.8H_2O$ and $FeSO_47H_2O$ were added to the plating bath so that as the first element, boron and iron were included in a porous body at a proportion in mass as shown in table 3 and $MgSO_4$ and $SnSO_4$ were added to the plating bath so that as the second element, magnesium and tin were included in the porous body at a proportion in mass as shown in table 3, porous bodies for Samples 43 to 45 were produced in the same manner as <Samples 1 to 12>.

<Samples 46 to 48>

Except that in the second step, $Na_2B_4O_5(OH)_4.8H_2O$, $FeSO_4.7H_2O$ and $CaSO_4.2H_2O$ were added to the plating bath so that as the first element, boron, iron and calcium were included in a porous body at a proportion in mass as shown in table 3 and $Al_2(SO_4)_3$, $Na_2SiO_3$ and $SnSO_4$ were added to the plating bath so that as the second element, aluminum, silicon, tin and sodium were included in the porous body at a proportion in mass as shown in table 3, porous bodies for Samples 46 to 48 were produced in the same manner as <Samples 1 to 12>.

<Samples 101 to 103>

Except that in the second step, salts corresponding to the first and second elements were not added to the plating bath (see Table 4), porous bodies for Samples 101 to 103 were produced in the same manner as <Samples 1 to 12>. In Table 4, and Table 5 described hereinafter, any cell of the columns of "first element" and "second element" indicating "-" means that the corresponding element is not included in a porous body.

<Samples 104 to 112>

Except that in the second step, a salt corresponding to the first element was not added to the plating bath and $SnSO_4$, $Na_2SO_4$ or $Cr_2(SO_4)_3.nH_2O$ was added to the plating bath so that as the second element, tin, sodium or chromium was included in a porous body at a proportion in mass as shown in table 4, porous bodies for Samples 104 to 112 were produced in the same manner as <Samples 1 to 12>.

<Samples 113 to 121>

Except that in the second step, $Na_2B_4O_5(OH)_4.8H_2O$, $FeSO_4.7H_2O$ or $CaSO_4.2H_2O$ was added to the plating bath so that as the first element, boron, iron or calcium was included in a porous body at a proportion in mass as shown in table 5 and a salt corresponding to the second element was not added to the plating bath (see Table 5), porous bodies for Samples 113 to 121 were produced in the same manner as <Samples 1 to 12>.

<Samples 122 to 130>

Except that in the second step, $Na_2B_4O_5(OH)_4.8H_2O$, $FeSO_4.7H_2O$ or $CaSO_4.2H_2O$ was added to the plating bath so that as the first element, boron, iron or calcium was included in a porous body at a proportion in mass as shown in table 5 and $Al_2(SO_4)_3$ was added to the plating bath so that as the second element, aluminium was included in the porous body at a proportion in mass as shown in table 5, porous bodies for Samples 122 to 130 were produced in the same manner as <Samples 1 to 12>.

Porous bodies for samples 1 to 48 and those for samples 101 to 130 were thus produced through the above procedure. Note that samples 1 to 48 correspond to examples, and samples 101 to 130 correspond to comparative examples.

<<Evaluating Performance of Porous Body>>

<Analyzing Physical Property of Porous Body>

The porous bodies of samples 1-48 and those of samples 101-130 were each examined for a proportion in mass of cobalt in the body of the framework of the porous body relative to a total mass of nickel and cobalt in the body of the framework of the porous body with an EDX device accompanying the SEM (an SEM part: trade name "SUPRA35VP" manufactured by Carl Zeiss Microscopy Co., Ltd., and an EDX part: trade name "octane super" manufactured by AMETEK, Inc.). Specifically, initially, the porous body of each sample was cut. Subsequently, the cut porous body had its framework observed in cross section with the EDX device to detect each element, and the cobalt's proportion in mass was determined based on the element's atomic percentage. As a result, the proportion in mass of cobalt in the body of the framework of the porous body of each of samples 1-48 and samples 101-130 relative to the total mass of nickel and cobalt in the framework matched the proportion in mass of cobalt contained in the plating bath used to prepare the porous body relative to the total mass of nickel and cobalt contained in the plating bath (i.e., a ratio in mass of Co/(Ni+Co)).

Further, the above calculation formula was used to determine the average pore diameter and porosity of the framework of each of the porous bodies of samples 1-48 and those of samples 101-130. As a result, the average pore diameter and porosity matched the resin molded body's porosity and average pore diameter, and the porosity was 96% and the average pore diameter was 450 μm. Further, the porous bodies of samples 1-48 and those of samples 101-130 had a thickness of 1.4 mm. In each of the porous bodies of samples 1-48 and those of samples 101-130, the total apparent weight of nickel and cobalt was 660 g/$m^2$, as has been set forth above.

<Evaluation for Power Generation>

Further, the porous bodies of samples 1-48 and those of samples 101-130 as a current collector for an air electrode, and a YSZ cell manufactured by Elcogen AS (see FIG. 9) were together used to fabricate fuel cells (see FIG. 8), and the fuel cells were evaluated for power generation by the following items:

(Evaluation of Fracture of Solid Electrolyte)

Fracture of solid electrolyte was evaluated through the following procedure. That is, after the above fuel cell was operated for 2,000 hours, the YSZ cell was visually observed for whether cracking and crack, and hence fracture were present or absent. A result thereof is shown in Tables 1 to 5.

(Evaluation of an Operating Voltage Keeping Ratio after 2,000 Hours of Power Generation)

For each fabricated fuel cell, an initial operating voltage V1 and an operating voltage V2 after 2,000 hours were determined, and a formula indicated below was used to calculate an operating voltage keeping ratio after 2,000 hours, and a result thereof is shown in Tables 1 to 5 below. In Table 5, "-" indicates that no operating voltage keeping ratio was measurable. Operating voltage V1 was measured three times and a result thereof was averaged to serve as operating voltage V1, and so was operating voltage V2.

$$\text{Operating voltage keeping ratio (\%) after 2,000 hours of power generation} = (V2/V1)\times 100$$

TABLE 1

| | porous body | | | | | | | operating |
|---|---|---|---|---|---|---|---|---|
| | | 1st element | | 2nd element | | | | voltage |
| sample Nos. | Proportion in mass of Co in NiCo | symbol of element | proportion in mass (ppm) | symbol of element | proportion in mass (ppm) | fracture of solid electrolyte | | keeping ratio after 2,000 hours (%) |
| 1 | 0.22 | B | 50 | Na | 5 | absent | | 96 |
| 2 | 0.58 | B | 50 | Na | 5 | absent | | 92 |
| 3 | 0.78 | B | 50 | Na | 5 | absent | | 95 |
| 4 | 0.22 | B | 60 | Al | 20 | absent | | 94 |
| 5 | 0.58 | B | 60 | Al | 20 | absent | | 92 |
| 6 | 0.78 | B | 60 | Al | 20 | absent | | 93 |
| 7 | 0.22 | B | 50 | Zn | 5 | absent | | 95 |
| 8 | 0.58 | B | 50 | Zn | 5 | absent | | 92 |
| 9 | 0.78 | B | 50 | Zn | 5 | absent | | 93 |
| 10 | 0.22 | B | 50 | Sn | 15 | absent | | 96 |
| 11 | 0.58 | B | 50 | Sn | 15 | absent | | 92 |
| 12 | 0.78 | B | 50 | Sn | 15 | absent | | 94 |
| 13 | 0.22 | Fe | 50 | Mg | 5 | absent | | 94 |
| 14 | 0.58 | Fe | 50 | Mg | 5 | absent | | 90 |
| 15 | 0.78 | Fe | 50 | Mg | 5 | absent | | 92 |
| 16 | 0.22 | Fe | 100 | Cu | 1 | absent | | 93 |
| 17 | 0.58 | Fe | 100 | Cu | 1 | absent | | 91 |
| 18 | 0.78 | Fe | 100 | Cu | 1 | absent | | 92 |
| 19 | 0.22 | Fe | 120 | K | 15 | absent | | 96 |
| 20 | 0.58 | Fe | 120 | K | 15 | absent | | 93 |
| 21 | 0.78 | Fe | 120 | K | 15 | absent | | 94 |
| 22 | 0.22 | Fe | 150 | Al | 15 | absent | | 94 |

TABLE 1-continued

| | porous body | | | | | | operating voltage |
|---|---|---|---|---|---|---|---|
| | | 1st element | | 2nd element | | | |
| sample Nos. | Proportion in mass of Co in NiCo | symbol of element | proportion in mass (ppm) | symbol of element | proportion in mass (ppm) | fracture of solid electrolyte | keeping ratio after 2,000 hours (%) |
| 23 | 0.58 | Fe | 150 | Al | 15 | absent | 91 |
| 24 | 0.78 | Fe | 150 | Al | 15 | absent | 92 |

TABLE 2

| | porous body | | | | | | operating voltage |
|---|---|---|---|---|---|---|---|
| | | 1st element | | 2nd element | | | |
| sample Nos. | Proportion in mass of Co in NiCo | symbol of element | proportion in mass (ppm) | symbol of element | proportion in mass (ppm) | fracture of solid electrolyte | keeping ratio after 2,000 hours (%) |
| 25 | 0.22 | Ca | 200 | Na | 2 | absent | 95 |
| 26 | 0.58 | Ca | 200 | Na | 2 | absent | 93 |
| 27 | 0.78 | Ca | 200 | Na | 2 | absent | 90 |
| 28 | 0.22 | Ca | 150 | Sn | 15 | absent | 97 |
| 29 | 0.58 | Ca | 150 | Sn | 15 | absent | 92 |
| 30 | 0.78 | Ca | 150 | Sn | 15 | absent | 94 |
| 31 | 0.22 | Ca | 100 | Cr | 5 | absent | 96 |
| 32 | 0.58 | Ca | 100 | Cr | 5 | absent | 92 |
| 33 | 0.78 | Ca | 100 | Cr | 5 | absent | 93 |
| 34 | 0.22 | Ca | 200 | Ti | 2 | absent | 95 |
| 35 | 0.58 | Ca | 200 | Ti | 2 | absent | 90 |
| 36 | 0.78 | Ca | 200 | Ti | 2 | absent | 92 |
| 37 | 0.22 | Ca | 200 | Si, Na | 15 (Si), 2 (Na) | absent | 96 |
| 38 | 0.58 | Ca | 200 | Si, Na | 15 (Si), 2 (Na) | absent | 92 |
| 39 | 0.78 | Ca | 200 | Si, Na | 15 (Si), 2 (Na) | absent | 94 |

TABLE 3

| | porous body | | | | | | operating voltage |
|---|---|---|---|---|---|---|---|
| | | 1st element | | 2nd element | | | |
| sample Nos. | Proportion in mass of Co in NiCo | symbol of element | proportion in mass (ppm) | symbol of element | proportion in mass (ppm) | fracture of solid electrolyte | keeping ratio after 2,000 hours (%) |
| 40 | 0.22 | B, Ca | 50 (B), 100 (Ca) | Al, Si, Na | 20 (Al), 40 (Si), 2 (Na) | absent | 94 |
| 41 | 0.58 | B, Ca | 50 (B), 100 (Ca) | Al, Si, Na | 20 (Al), 40 (Si), 2 (Na) | absent | 92 |
| 42 | 0.78 | B, Ca | 50 (B), 100 (Ca) | Al, Si, Na | 20 (Al), 40 (Si), 2 (Na) | absent | 93 |
| 43 | 0.22 | B, Fe | 50 (B), 150 (Fe) | Mg, Sn | 10 (Mg), 15 (Sn) | absent | 95 |
| 44 | 0.58 | B, Fe | 50 (B), 150 (Fe) | Mg, Sn | 10 (Mg), 15 (Sn) | absent | 90 |
| 45 | 0.78 | B, Fe | 50 (B), 150 (Fe) | Mg, Sn | 10 (Mg), 15 (Sn) | absent | 92 |
| 46 | 0.22 | B, Fe, Ca | 50 (B), 150 (Fe), 200 (Ca) | Al, Si, Sn, Na | 20 (Al), 40 (Si), 15 (Sn), 2 (Na) | absent | 97 |
| 47 | 0.58 | B, Fe, Ca | 50 (B), 150 (Fe), 200 (Ca) | Al, Si, Sn, Na | 20 (Al), 40 (Si), 15 (Sn), 2 (Na) | absent | 92 |
| 48 | 0.78 | B, Fe, Ca | 50 (B), 150 (Fe), 200 (Ca) | Al, Si, Sn, Na | 20 (Al), 40 (Si), 15 (Sn), 2 (Na) | absent | 94 |

TABLE 4

| | porous body | | | | | | operating |
|---|---|---|---|---|---|---|---|
| | | 1st element | | 2nd element | | | voltage |
| sample Nos. | Proportion in mass of Co in NiCo | symbol of element | proportion in mass (ppm) | symbol of element | proportion in mass (ppm) | fracture of solid electrolyte | keeping ratio after 2,000 hours (%) |
| 101 | 0.22 | — | — | — | — | absent | 52 |
| 102 | 0.58 | — | — | — | — | absent | 50 |
| 103 | 0.78 | — | — | — | — | absent | 51 |
| 104 | 0.22 | — | — | Sn | 15 | absent | 62 |
| 105 | 0.58 | — | — | Sn | 15 | absent | 58 |
| 106 | 0.78 | — | — | Sn | 15 | absent | 60 |
| 107 | 0.22 | — | — | Na | 5 | absent | 53 |
| 108 | 0.58 | — | — | Na | 5 | absent | 51 |
| 109 | 0.78 | — | — | Na | 5 | absent | 52 |
| 110 | 0.22 | — | — | Cr | 5 | absent | 54 |
| 111 | 0.58 | — | — | Cr | 5 | absent | 52 |
| 112 | 0.78 | — | — | Cr | 5 | absent | 53 |

TABLE 5

| | porous body | | | | | | operating |
|---|---|---|---|---|---|---|---|
| | | 1st element | | 2nd element | | | voltage |
| sample Nos. | Proportion in mass of Co in NiCo | symbol of element | proportion in mass (ppm) | symbol of element | proportion in mass (ppm) | fracture of solid electrolyte | keeping ratio after 2,000 hours (%) |
| 113 | 0.22 | B | 50 | — | — | absent | 60 |
| 114 | 0.58 | B | 50 | — | — | absent | 56 |
| 115 | 0.78 | B | 50 | — | — | absent | 57 |
| 116 | 0.22 | Fe | 50 | — | — | absent | 61 |
| 117 | 0.58 | Fe | 50 | — | — | absent | 57 |
| 118 | 0.78 | Fe | 50 | — | — | absent | 58 |
| 119 | 0.22 | Ca | 200 | — | — | absent | 59 |
| 120 | 0.58 | Ca | 200 | — | — | absent | 55 |
| 121 | 0.78 | Ca | 200 | — | — | absent | 57 |
| 122 | 0.22 | B | 100,000 | Al | 15 | present | — |
| 123 | 0.58 | B | 100,000 | Al | 15 | present | — |
| 124 | 0.78 | B | 100,000 | Al | 15 | present | — |
| 125 | 0.22 | Fe | 100,000 | Al | 15 | present | — |
| 126 | 0.58 | Fe | 100,000 | Al | 15 | present | — |
| 127 | 0.78 | Fe | 100,000 | Al | 15 | present | — |
| 128 | 0.22 | Ca | 100,000 | Al | 15 | present | — |
| 129 | 0.58 | Ca | 100,000 | Al | 15 | present | — |
| 130 | 0.78 | Ca | 100,000 | Al | 15 | present | — |

<Discussions>

According to a result shown in Tables 1 to 3, it has been found that there is no fracture observed in a solid electrolyte included in a fuel cell when a framework has a body including nickel, cobalt, the first element and the second element, with the first and second elements together having a proportion in mass of 5 ppm or more and 50,000 ppm or less in total relative to the mass of the body of the framework. Further, it has been found that the fuel cell has an operating voltage keeping ratio exceeding 90% after 2,000 hours of power generation and is thus satisfactory, in particular, when the cobalt has a proportion in mass of 0.22 relative to the total mass of the nickel and the cobalt, it allows an operating voltage keeping ratio after 2,000 hours of power generation to be particularly more satisfactory than when it has a proportion in mass of 0.58 or 0.78 relative to the total mass of the nickel and the cobalt.

Thus it has been found that the porous bodies according to the examples had appropriate strength as a current collector for an air electrode of a fuel cell and a current collector for a hydrogen electrode of the fuel cell.

According to a result shown in Tables 4 and 5, no cracking was observed in a solid electrolyte included in a fuel cell when a framework had a body which included nickel and cobalt and did not include the first element, the second element or both. However, such fuel cells presented an operating voltage keeping ratio of 62% or less after 2,000 hours of power generation (Samples 101 to 121). It is believed that the fuel cells of Samples 101 to 121 had a current collector for an air electrode (or a porous body) that was relatively weak in strength and contact between the current collector for the air electrode and a cell for the fuel cell or an interconnector was weakened after 2,000 hours of power generation. As a result, it is believed that contact resistance increased and the operating voltage keeping ratio decreased. Further, according to a result shown in Table 5, cracking was observed in a solid electrolyte included in a fuel cell when a framework had a body which included nickel, cobalt, the first element, and the second element with the first and second elements together having a proportion in mass exceeding 50,000 ppm in total relative to the mass of the body of the framework (Samples 122 to 130). As the fuel cells of Samples 122 to 130 thus had a solid electrolyte cracked, no operating voltage keeping ratio was measurable after 2000 hours of power generation, Although embodiments and examples of the present invention have been described as described above, it has also been planned from the beginning to appropriately combine the configurations of the above-described embodiments and examples.

It should be understood that the presently disclosed embodiments and examples are illustrative in any aspect and not restrictive. The scope of the present invention is defined by the terms of the claims, rather than the embodiments and examples described above, and is intended to include any modifications within the scope and meaning equivalent to the terms of the claims.

REFERENCE SIGNS LIST

1 rib, 2 node, 10 frame, 11 framework body, 12 framework, 13 inner portion, 14 pore; 20 cell, 30 three-dimensional network structure, 100 cell for fuel cell, 102 air electrode, 104 intermediate layer, 106 electrolyte layer, 108 hydrogen electrode, 110 current collector for hydrogen electrode, 112 first interconnector, 114 fuel channel, 120 current collector for air electrode, 122 second interconnector, 124 oxidant channel, 150 fuel cell, A virtual plane.

The invention claimed is:

1. A porous body comprising an electrode material and having a framework having a polyhedral network structure, the framework having a body including nickel, cobalt, a first element, and a second element as constituent elements, the cobalt having a proportion in mass of 0.2 or more and 0.8 or less relative to a total mass of the nickel and the cobalt, the first element consisting of at least one element selected from the group consisting of boron, iron and calcium, the second element consisting of at least one element selected from the group consisting of sodium, magnesium, aluminum, silicon, potassium, titanium, chromium, copper, zinc and tin, wherein the first element has a proportion in mass of 4 ppm or more and 40,000 ppm or less in total relative to a mass of the body of the framework, wherein the second element has a proportion in mass of 1 ppm or more and 10,000 ppm or less relative to the mass of the body of the framework, and wherein the framework has an average pore diameter of 60 μm or more and 3,500 μm or less.

2. The porous body according to claim 1, wherein the cobalt has a proportion in mass of 0.2 or more and 0.45 or less or 0.6 or more and 0.8 or less relative to the total mass of the nickel and the cobalt.

3. The porous body according to claim 1, wherein the body of the framework further includes oxygen as a constituent element.

4. The porous body according to claim 3, wherein the body of the framework includes the oxygen in an amount of 0.1% by mass or more and 35% by mass or less.

5. The porous body according to claim 3, wherein the body of the framework includes a spinel-type oxide.

6. The porous body according to claim 1, wherein when the body of the framework is observed in cross section at a magnification of 3,000 times to obtain an observed image the observed image presents in any area 10 μm square thereof five or less voids each having a longer diameter of 1 μm or more.

7. The porous body according to claim 1, wherein the framework is hollow.

8. A fuel cell comprising a current collector for an air electrode and a current collector for a hydrogen electrode, wherein at least one of the current collector for the air electrode or the current collector for the hydrogen electrode includes the porous body according to claim 1.

9. The porous body according to claim 1, wherein the first element has a proportion in mass of 4 ppm or more and 400 ppm or less in total relative to a mass of the body of the framework, and wherein the second element has a proportion in mass of 1 ppm or more and 77 ppm or less relative to the mass of the body of the framework.

10. The porous body according to claim 1, wherein the first and second elements together have a proportion in mass of 55 ppm or more and 477 ppm or less, relative to the mass of the body of the framework.

11. The porous body according to claim 1, wherein the body of the framework includes the oxygen in an amount of 10% by mass or more and 28% by mass or less.

12. The porous body according to claim 9, wherein the first and second elements together have a proportion in mass of 55 ppm or more and 477 ppm or less, relative to the mass of the body of the framework.

13. The porous body according to claim 12, wherein the body of the framework includes the oxygen in an amount of 10% by mass or more and 28% by mass or less.

14. The porous body according to claim 1, wherein the cobalt has a proportion in mass of 0.6 or more and 0.8 or less relative to the total mass of the nickel and the cobalt.

15. A fuel cell comprising a current collector for an air electrode and a current collector for a hydrogen electrode, wherein at least one of the current collector for the air electrode or the current collector for the hydrogen electrode includes the porous body according to claim 9.

* * * * *